Jan. 24, 1950  E. H. LUSK  2,495,376
VENTILATING APPARATUS
Filed June 29, 1946
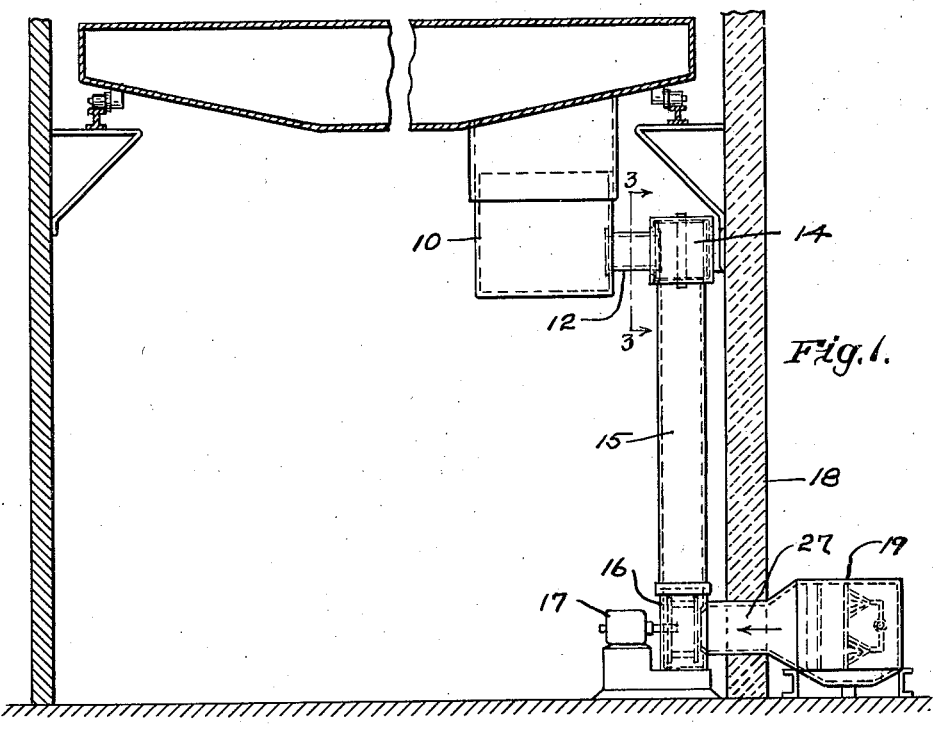
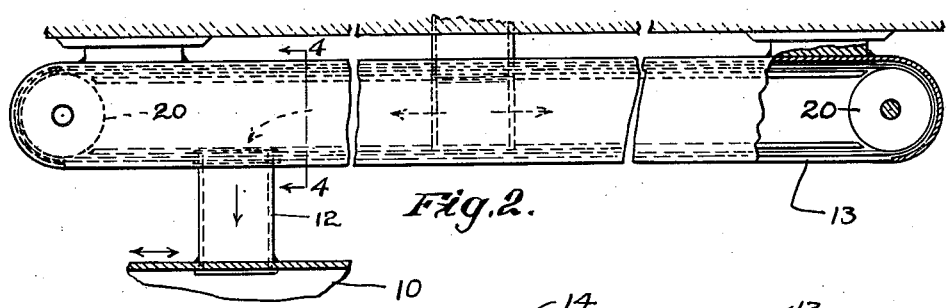
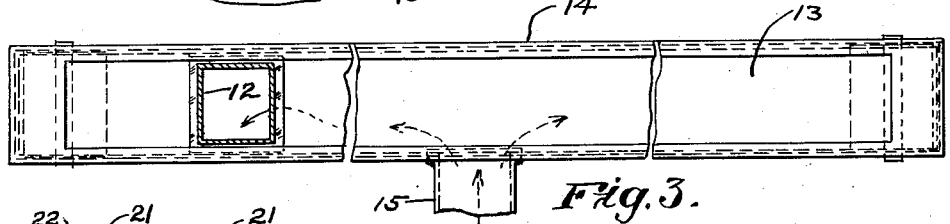
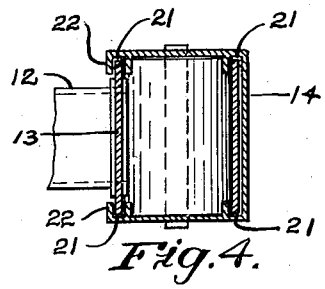
INVENTOR.
Eldon H. Lusk
BY Robert T. Palmer
Attorney Patented Jan. 24, 1950

2,495,376

UNITED STATES PATENT OFFICE 2,495,376

VENTILATING APPARATUS

Eldon H. Lusk, Sharon, Mass., assignor to Westinghouse Electric Corporation, a corporation of Pennsylvania Application June 29, 1946, Serial No. 680,504

4 Claims. (Cl. 98—39)

This invention relates to ventilating and air conditioning systems for movable enclosures, and relates more particularly to ventilating and air conditioning systems for the cabs of overhead cranes.

The cabs of overhead cranes in locations such as foundries, travel above moulds and furnaces which not only add heat to, but add fumes and smoke to the air to which the operators of the cranes are exposed. For providing comfortable conditions for the operators, it has been proposed to mount in each cab, an air cooling system utilizing mechanical refrigeration. While such equipment could cool the air satisfactorily, it could not clean the contaminated air effectively, and the cost of operating such equipment would be excessive due to the high temperatures to which the condensers would be exposed.

This invention provides a ventilating and air conditioning system for the cab of an overhead crane, in which the air cooling and cleaning equipment and the ventilating fan, is located external the cab in a location providing clean air, the conditioner supplying clean, cool air into a stationary duct having one side formed as an endless belt to which the cab is connected by a duct movable with the cab whereby the belt moves with the cab, and air is supplied through an opening therein, into the duct movable with the cab, and through same into the cab interior.

An object of the invention is to provide an air supply duct for supplying air from a remote location to a movable enclosure.

A more definite object of the invention is to provide an air supply duct for supplying conditioned air to the cab of an overhead crane, from equipment handling relatively clean air, and located external the cab.

The invention will now be described with reference to the drawing, of which:

Fig. 1 is a side elevation of an overhead crane cab equipped with an air conditioning system embodying this invention;

Fig. 2 is a plan view looking downwardly upon the horizontal duct of Fig. 1, which is aligned with the crane cab, and of the duct connecting the movable wall thereof with the cab, a portion of the upper wall of the horizontal duct being broken away for illustrating one of the end pulleys over which the movable duct wall travels as an endless belt;

Fig. 3 is a sectional view along the lines 3—3 of Fig. 1, and Fig. 4 is a sectional view along the lines 4—4 of Fig. 2.

The cab 10 is a conventional operator's cab of an overhead crane 11. The duct 12 is attached to the cab so as to be movable therewith, and has one end connected into the interior of the cab for supplying air thereinto. The other end of the duct 12 is connected to the belt 13 which forms the movable wall of the horizontally extending duct 14. The belt 13 has an outlet opening therein in alignment with the inlet opening in the duct 12 whereby air from the duct 14 passes through the duct 12 into the interior of the cab.

The duct 14 is rectangular in cross-section, having three conventional, stationary sides, but having its side facing the cab 10, formed by the belt 13 which revolves over the end pulleys 20 as it is moved by the movement of the cab, the pulleys being in the interior of the duct 14 at the ends thereof. The belt 13 travels in the guideways 21 which may be lubricated for reducing friction.

The duct 14 is connected by the vertically extending duct 15 with the outlet of the centrifugal fan 16 which is driven by the electric motor 17. The inlet of the fan is connected by the duct 27 extending through the wall 18 of the building, with the outlet of the air washer 19 having an inlet for outdoor air.

In operation, the fan 16 draws outdoor air through the water spray in the washer 19, and supplies it through the ducts 15, 14 and 12 into the crane cab. In many locations the spray water can be recirculated providing evaporative cooling. In other locations having such high, outdoor, wet bulb temperatures that evaporative cooling is not effective, the spray water can be cooled by ice or other forms of refrigeration. The air washer acts to clean as well as to cool the air.

The pressure of the air in the duct 14 will tend to force the belt against the inner surfaces of the duct extensions 22 thus reducing leakage from the duct. Any leakage that occurs will be outward, and will prevent dust and other foreign matter from entering the tracks 21. If desired, an air seal can be provided by conventional wipers.

The belt 13 may be of sheet metal, rubberized belting or of other suitable material.

While one embodiment of the invention has been described for the purpose of illustration, it should be understood that the invention is not limited to the exact apparatus and arrangement of apparatus illustrated since modifications thereof may be suggested by those skilled in the art, without departure from the essence of the invention.

What is claimed is:

1. A ventilating system for a movable enclosure, comprising a supply duct movable with the enclosure and connecting at one end with the interior thereof, a stationary duct extending parallel the path of movement of said enclosure and having an open side facing said enclosure, an endless belt rotatable in said stationary duct and filling said open side thereof, said belt having an opening therein, said supply duct being connected at its other end to said belt in alignment with said opening, means forming an air inlet passage into said stationary duct between the opposite sides of said belt, and means for supplying air into said passage.

2. A ventilating system for a movable enclosure, comprising a supply duct movable with the enclosure and connecting at one end with the interior thereof, a stationary duct extending parallel the path of movement of said enclosure and having an open side facing said enclosure, pulleys in said stationary duct adjacent the ends thereof, an endless belt rotatable around said pulleys and filling said open side, said belt having an opening therein, said supply duct being connected at its other end to said belt in alignment with said opening, means forming an air inlet passage into said stationary duct between the opposite sides of said belt, and means for supplying air into said passage.

3. A ventilating system for a movable enclosure, comprising a supply duct movable with the enclosure and connecting at one end with the interior thereof, a stationary duct extending parallel the path of movement of said enclosure and having an open side facing said enclosure, belt tracks in said open side, and an endless belt slidable in said tracks, said belt having an opening therein, said supply duct being connected at its other end to said belt in alignment with said opening, means forming an air inlet passage into said stationary duct between the opposite sides of said belt, and means for supplying air into said passage.

4. A ventilating system for a movable enclosure, comprising a supply duct movable with the enclosure and connecting at one end with the interior thereof, a stationary duct extending parallel the path of movement of said enclosure and having an open side facing said enclosure, belt tracks in said open side, pulleys in said stationary duct adjacent the ends thereof, an endless belt rotatable around said pulleys and extending in said tracks so as to fill said open side, said belt having an opening therein, said supply duct being connected to said belt in alignment with said opening, means forming an air inlet passage into said stationary duct between the opposite sides of said belt, and means for supplying air into said passage.

ELDON H. LUSK.

REFERENCES CITED

The following references are of record in the file of this patent:

UNITED STATES PATENTS

| Number | Name | Date |
|---|---|---|
| 2,204,401 | Butler | June 11, 1940 |
| 2,251,230 | Ragsdale | July 29, 1941 |
| 2,268,530 | Waechter | Dec. 30, 1941 |
| 2,348,455 | Daudelin | May 9, 1944 |

FOREIGN PATENTS

| Number | Country | Date |
|---|---|---|
| 19,838 | Great Britain | A. D. 1905 |
| 498,449 | Germany | Mar. 22, 1930 |